Nov. 19, 1935.   D. I. BOHN   2,021,477
RESISTANCE WELDING
Filed Aug. 5, 1933

INVENTOR
Donald I. Bohn.
BY
ATTORNEY

Patented Nov. 19, 1935

2,021,477

UNITED STATES PATENT OFFICE 2,021,477

RESISTANCE WELDING

Donald I. Bohn, Pittsburgh, Pa., assignor to Aluminum Company of America, Pittsburgh, Pa., a corporation of Pennsylvania Application August 5, 1933, Serial No. 683,794

6 Claims. (Cl. 219—10)

This invention relates to the electric welding of metals, and particularly to the electric welding of metal parts or sheets provided with surface coatings having dielectric characteristics. More specifically, this invention is concerned with the welding of metals having dielectric coatings by the processes broadly known as resistance welding, in which the metal is simultaneously subjected to mechanical pressure and to the passage of an electric current of high density to effect the weld.

Figure 1:
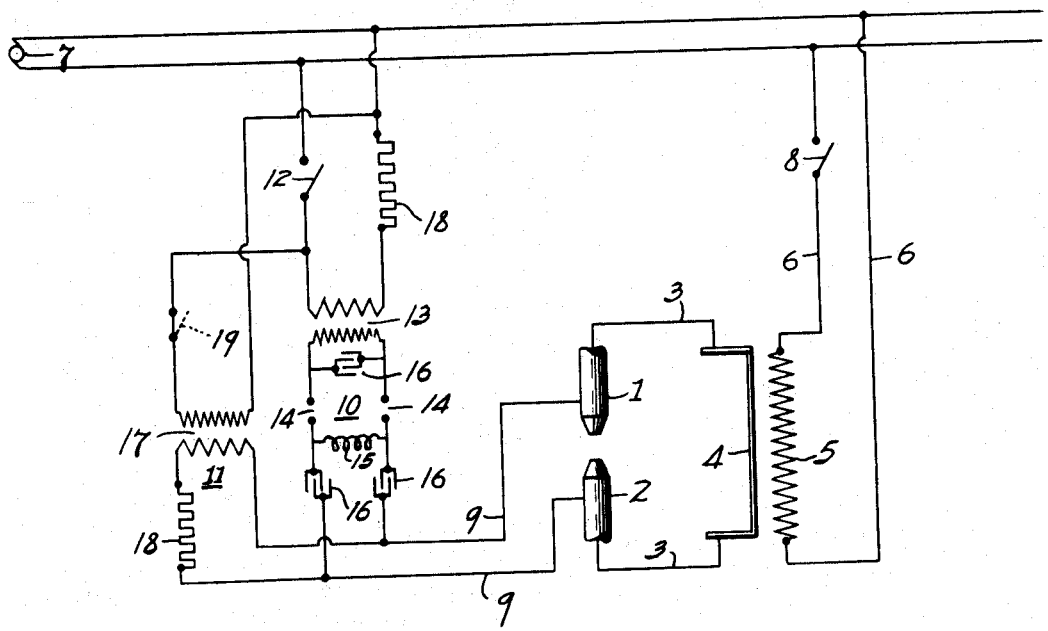
Figure 2:
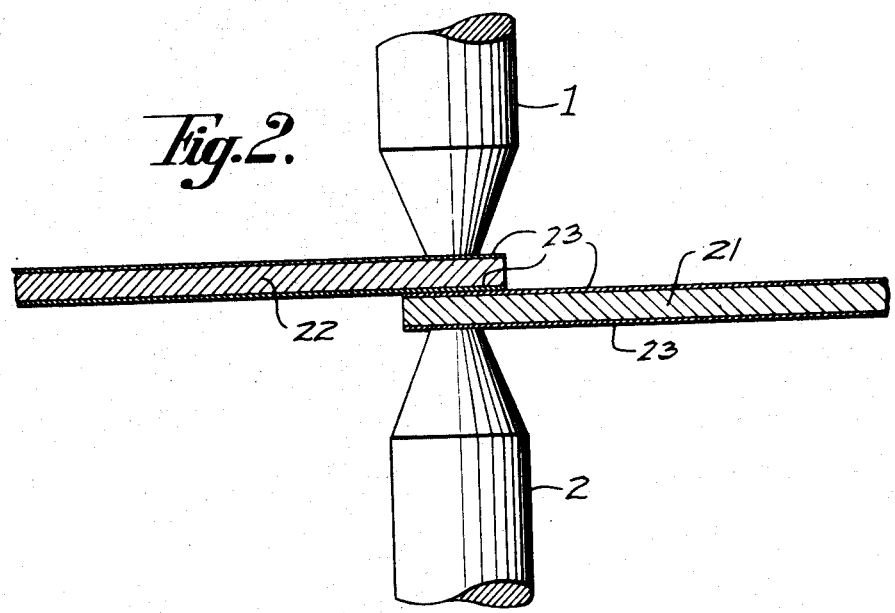

It is an object of my invention to provide an improved method of welding metals having coatings of high electrical insulating characteristics. A further object is the provision of apparatus suitable for use in the practice of my improved method of welding. Other objects will be apparent from the following description and the accompanying drawing, in which:

Fig. 1 illustrates, in conventional diagrammatic form, a preferred arrangement of electrical apparatus which may be employed in the practice of my invention; and Fig. 2 is an enlarged detail view of part of the apparatus in operative position.

Many of the coatings applied to metals for the purpose of protecting the surface or for decorative effects are substantially non-conducting or have a high electrical insulating value. For example, aluminum surfaces are often protected by producing heavy aluminum oxide coatings thereon, as by immersing the aluminum in a suitable electrolyte and making it the anode in an electric circuit. These anodically or otherwise produced oxide coatings have high dielectric values, and are often used for insulating purposes up to several hundred volts. Such coatings are highly resistant to abrasion and therefore are difficult to remove to effect the metal-to-metal contact required for the ordinary methods of resistance welding of the articles to which they are applied. This preliminary removal of the coating thus adds to the cost of welding. By employing my improved method it is unnecessary to remove the coating before starting the welding operation.

My improved method of welding is also applicable to the welding of other metals having coatings which prevent the passage of electric currents at the low voltages usually used in resistance welding. It is broadly applicable to the welding of any metals which can be welded by resistance methods, and which are provided with dielectric coatings such as paint, lacquer, varnish, metal oxides, or the like. However, my invention will now be described in detail as applied to the welding of aluminum sheet provided with an anodically formed oxide coating. This material has been found to present one of the most difficult problems in welding by the resistance process, and the solution to this problem is applicable with little or no modification to other problems encountered in the resistance welding of other metals with dielectric coatings.

To effect a weld according to my invention, two pieces of aluminum sheet having anodic oxide coatings, for example, are pressed tightly together between resistance welding electrodes, and an electric current having a sufficiently high voltage to break down or puncture the insulating film on the material is applied to the electrodes. This initial high voltage application produces small conducting paths through the insulating film. The area of the paths thus produced is dependent largely on the amperage of the current application; that is, if the current value is very small, as is usually the case, the area of the paths will be small. For this reason the initial application of high voltage current is preferably, though not necessarily followed by a current application of considerably higher amperage and reduced voltage, as compared to the initial current application, to enlarge the area of the conducting paths. The material is then subjected to the heavy current required for resistance welding, which may be supplied by a heavy current, low voltage transformer such as normally used for resistance welding. In some cases the second or intermediate step or steps may be omitted if the initial current application is sufficient to disrupt the insulating coating to such an extent that the conducting paths through the coating are large enough to carry the low voltage welding current.

Referring to the drawing and particularly to Fig. 1, a convenient form of apparatus is illustrated for carrying out my improved process. Two spot welding electrodes 1 and 2 of the usual form are connected by means of conductors 3 to the secondary 4 of a high current density resistance welding transformer, the primary 5 of which is adapted to be energized through conductors 6 by a suitable energy source such as a generator 7. This primary circuit is controlled by a switch 8. The electrodes are also connected by means of conductors 9 to circuits 10 and 11 adapted to be energized from the energy source 7 by closing switch 12.

The circuit 10 may be of any form suitable for supplying high voltage current to the electrodes. Preferably, however, the high voltage current is impressed on the electrodes at very high frequency, for example thousands of cycles per second, for reasons to be explained later.

As illustrated, the circuit 10 comprises a conventional source of high voltage, high frequency current, consisting of a step-up transformer 13, spark gaps 14, choke coil 15, and condensers 16. Circuit 11 is connected in parallel with circuit 10, and is adapted to provide current at a voltage intermediate the high voltage of circuit 10 and the low voltage of the welding circuit, usually by a suitable transformer 17. Suitable control resistances 18 may be provided in circuits 10 and 11, and the circuit 11 may be provided with a separate switch 19 if desired.

When employing the apparatus above described to effect a weld by my improved method, two pieces of metal, such as aluminum sheets having anodic coatings formed thereon, are placed between the electrodes 1 and 2 as illustrated in Fig. 2. In this view, 21 and 22 indicate the pieces of metal to be welded and 23 indicates the coating. Pressure is applied to the electrodes to bring the two pieces of metal in tight-pressed relationship, in the usual manner employed in spot welding, and circuits 10 and 11 are then energized by closing switch 12. Instantaneously the high voltage current of circuit 10 will break through or puncture the anodic coating, forming relatively small conducting paths. Once these paths are formed through the coating the lower voltage current of circuit 11 will flow through the metal and further disrupt the coating until relatively large conducting paths are formed. The high amperage, low voltage welding current is then applied to effect the weld, as by closing the switch 8.

Various methods of applying the several currents may be used, the method preferred in any given instance depending on the design characteristics of the various circuits employed. If proper design characteristics are selected, all of the circuits may be energized simultaneously, or they may be energized singly in the proper sequence by means of switches 8, 12, and 19. As stated previously, in some cases the intermediate voltage application i. e., that provided by circuit 11, may be omitted, as by eliminating the circuit or by leaving the switch 19 open; and in other cases it may be necessary to provide several intermediate steps of progressively increasing current density to provide conducting paths suitable for the heavy welding current.

In the embodiment of the invention illustrated and described, the initial high voltage current is supplied by circuit 10 at high frequency. This current can be applied at any frequency, but if a low frequency is used it is preferable and sometimes necessary to disconnect other circuits, such as the circuit 3 of the secondary of the heavy current welding transformer, to prevent a short circuit across the high voltage conductors 9. When this high voltage from circuit 10 is applied at high frequency, the impedance of the remainder of the circuit or of the other circuits is sufficient to permit such application directly to the electrodes without damaging other parts of the system, which need not then be disconnected.

While the foregoing description is particularly concerned with the spot welding of aluminum sheet provided with an anodically produced oxide coating, it is apparent that the process and apparatus are suitable for use with any material having a dielectric or insulating coating and capable of being welded. The method and the essential features of the apparatus described can also be used with any of the other resistance welding processes, such as butt and seam welding, for example. In the process of butt welding, the pieces to be welded are brought together by means of a pair of clamping members which are connected to the circuit in the same manner as are the electrodes illustrated. In the process of seam welding, the electrodes take the form of rollers.

As an example of the magnitudes of the various currents employed in welding aluminum provided with an anodic coating by my improved method, the initially applied current may be in the order of a fraction of an ampere at several thousand volts and at a frequency of many thousands of cycles per second. The intermediate current application, when used, may be in the order of 50 to 100 amperes at any convenient voltage such as 110 or 220, and at ordinary alternating current frequency such as 50 or 60 cycles per second. The welding current may be in the order of 10,000 to 50,000 amperes, at from 5 to 10 volts. It is apparent that these values must be varied considerably, depending on the material to be welded, the type of coating thereon, and the thickness of the metal. It is only necessary that the initial current application be at a sufficiently high voltage to puncture the coating and form a conducting path, and that the intermediate steps, if any, serve the purpose of enlarging the conducting path or paths sufficiently to permit passage of the final or welding current. The density and voltage of this last application are largely determined by the kind and thickness of the material welded, and the most suitable values can be readily determined by those skilled in the art of resistance welding.

While I have shown and described an embodiment of my invention which is now preferred and have given specific details of its construction and operation, I do not wish to limit myself thereto but may make various changes therein without departing from the spirit of my invention within the scope of the appended claims.

I claim:

1. The method of welding aluminum and aluminum base alloys provided with an anodically produced oxide coating, which comprises applying thereto an electric current of high voltage and low amperage to puncture the said oxide coating and applying thereto at least one other electric current of lower voltage and higher amperage.

2. A method of welding aluminum and aluminum base alloys provided with an anodically produced oxide coating, comprising applying a high voltage current to puncture the said oxide coating and subsequently applying a low voltage, high amperage welding current.

3. The method of resistance welding aluminum and aluminum base alloys provided with an anodically produced oxide coating, comprising subjecting the metal articles to pressure, applying an electric current at high voltage to puncture said coating, enlarging the conducting paths thus formed by applying a current of a higher density and lower voltage than the initial current, and finally applying a current of high density and low voltage to effect a resistance weld.

4. The method of resistance welding aluminum and aluminum base alloys provided with an anodically produced oxide coating, comprising subjecting the metals to pressure, applying an electric current at high voltage and high frequency to puncture said coating, enlarging the conducting paths thus formed by applying a current of higher density and lower voltage than the initial current, and finally applying a current of high density and low voltage to effect a resistance weld.

5. In apparatus for the resistance welding of aluminum and aluminum base alloys provided with an anodically produced oxide coating, means for subjecting the articles to the action of a high voltage current to puncture said coating, means for applying a current of higher amperage and lower voltage than the initial current to enlarge the conducting paths formed thereby, and means for applying a low voltage high amperage current to effect the weld.

6. The method of welding aluminum and aluminum base alloys provided with an anodically produced oxide coating, which comprises pressing the articles together between electrodes, energizing parallel electric circuits connected to said electrodes to apply a plurality of electric currents to said articles, one of said currents being at a sufficiently high voltage to puncture the dielectric coating and form a conducting path which is enlarged by another of said currents, and applying a current of high density to said articles to complete the weld.

DONALD I. BOHN.